United States Patent [19]

Müller et al.

[11] Patent Number: 5,564,976
[45] Date of Patent: Oct. 15, 1996

[54] VENTILATOR COVER WITH A SEALING ELEMENT AND METHOD FOR THE PRODUCTION THEREOF

[75] Inventors: Manfred Müller, Adlkofen, Germany; Fritz Gödl, Ennetbürgen, Switzerland

[73] Assignee: Norm A.M.C. AG, Switzerland

[21] Appl. No.: 391,562

[22] Filed: Feb. 21, 1995

[30] Foreign Application Priority Data

Feb. 18, 1994 [DE] Germany .......................... 44 05 201.4
Mar. 24, 1994 [DE] Germany .......................... 44 10 199.6

[51] Int. Cl.⁶ ....................................................... F24F 7/02
[52] U.S. Cl. .................................. 454/365; 52/57; 52/199
[58] Field of Search ......................... 52/57, 199; 454/365

[56] References Cited

FOREIGN PATENT DOCUMENTS

| | | |
|---|---|---|
| 2023594 | 2/1973 | Germany . |
| 7735410 | 4/1978 | Germany . |
| 2810759 | 9/1979 | Germany .............................. 454/365 |
| 8416540 | 9/1984 | Germany . |
| 3511798 | 12/1985 | Germany .............................. 454/365 |
| 8712892 | 9/1987 | Germany . |
| 8527095 | 10/1987 | Germany . |
| 8717115 | 12/1987 | Germany . |
| 3615015 | 12/1987 | Germany .............................. 454/365 |
| 8715159 | 2/1988 | Germany . |
| 8713110 | 3/1988 | Germany . |
| 3801330 | 7/1988 | Germany . |
| 8904943 | 4/1989 | Germany . |
| 3806683 | 9/1989 | Germany . |
| 3812305 | 10/1989 | Germany . |
| 3836334 | 4/1990 | Germany . |
| 8913744 | 4/1990 | Germany . |
| 8915775 | 7/1991 | Germany . |
| 9111300 | 1/1992 | Germany . |
| 9115241 | 4/1992 | Germany . |

OTHER PUBLICATIONS

Beilage DDH, H.6, 1991, Eing, DPA 3.4.91 (published 27 Mar. 1991).
Extract of pp. 68–73, Portion of Chapter III of Kunststoff–Taschenbuch, published 1992.

Primary Examiner—Harold Joyce
Attorney, Agent, or Firm—Sixbey, Friedman, Leedom & Ferguson, P.C.; David S. Safran

[57] ABSTRACT

Ventilator cover (1) for exhaust ventilation of roofs in the ridge, hip or arris area, with preferably a plastic ventilator cover body (2) and sealing element (9), the sealing element (9) having a shape approximating that of a wedge in cross section and a sealing element body (10) which consists of plastic foam. To improve sealing properties and to increase the service life of the sealing element (9), an essentially nonporous skin (14) is provided on at least one of the free surfaces (11, 12), preferably on outside surface (11), of the sealing element body (10) so as to cover roughly its entire area. This skin (14) is formed from a structural change of the material of the sealing element body (10) at its surface (11, 12), so that the skin consists of the same plastic as the sealing element body (10), and is permanently connected to it.

11 Claims, 4 Drawing Sheets

VENTILATOR COVER WITH A SEALING ELEMENT AND METHOD FOR THE PRODUCTION THEREOF

BACKGROUND OF THE INVENTION

1. Field of the Invention

The invention relates to a ventilator cover for exhaust ventilation of roofs in the ridge, hip or arris area, with a preferably plastic ventilator cover body and a sealing element, the sealing element having a shape approximating that of a wedge in cross section and a sealing element body consisting of plastic foam. Furthermore, the invention relates to a sealing element of the aforementioned type and a process for producing, on the one hand, a ventilator cover, and on the other, a sealing element.

2. Description of Related Art

Ventilator covers have been known for some time. They are located in the ridge, hip or arris area of a roof in order to prevent possible damage by moisture formation. Using a ventilator cover with ventilator cover bodies which have air passage openings, for the corresponding incident flow a negative pressure below the ventilator cover is generated which leads to ventilation of the roof space. As a result of this function, these ventilator covers are also called exhaust ventilator covers. To guarantee effective exhaust ventilation in the roof area, a good seal between the roof, on the one hand, and the ventilator covers, on the other, is necessary. For this reason, wedge-shaped sealing elements are used which have a sealing element body formed of a plastic foam. These sealing elements, which are also called foam sealing wedges or foam filter wedges, are already known from German Utility Model Nos. 84 16 540, 85 27 095, 87 12 892, 87 13 110, 87 17 115, and 89 14 943, Published German Application Nos. 35 11 798, 38 06 683, 38 12 305, and 38 36 334, and German Patent No. 36 15 01.

Ventilator covers of this type are generally attached in the middle on the ridge beam of a roof. The wedge-shaped sealing elements, which have high flexibility due to their sealing element body being made of plastic foam, are pressed wit their tips against the roof covering; this, then, leads to the aforementioned sealing. If flow takes place against or over the ventilator covers, a negative pressure develops in the ridge area of the roof, as already mentioned.

The ventilator cover bodies of known ventilator covers are usually produced by extrusion or injection molding. In extrusion, post-treatment is still necessary to firm the specific shape of the ventilator cover body; this is not necessary in discontinuous injection molding.

The sealing elements which have a sealing element body of plastic foam are generally produced by extrusion. In doing so, the plastic used is normally foamed using a blowing agent as it leaves the extrusion tool. During extrusion, relatively long foam slabs of great width and comparably low thickness are continuously produced. These molded articles generally have low dimensional accuracy. Upon subsequent cooling of the extruded molded article, it can collapse at various points; this is the result of condensation of the blowing agent at these points. Condensation of the blowing agent is undesirable since it leads to wavy surfaces on the molded article, and further, increases the waste which is formed in relatively large amounts anyway. This results from the fact that wedge-shaped sealing elements of comparatively high dimensional accuracy are subsequently cut from the completely foamed molded article.

The sealing elements cut in a wedge shape are each cemented to the bottom of the ventilator cover body to produce the ventilator covers. Since the ventilator covers generally have a shape which is arched downward, the sealing elements, in the mounted state of the ventilator covers, are generally not visible. Still, the outside surface of the sealing elements is exposed to weathering and UV radiation. After some time, this can lead to damage to the plastic foam, and thus, to sealing element leaks. As a result of leaks, the sealing action of the sealing element is reduced; this is associated with poorer ventilation and penetration of moisture into the interior of the roof.

SUMMARY OF THE INVENTION

Accordingly, it is an object of the present invention to improve over the ventilator caps of the prior and the methods by which they are made, so as to avoid the above-mentioned problems thereof.

To this end, the invention takes a new approach by which it is provided that the sealing element body on at least one of its free surfaces, preferably on the outside surface, has an essentially nonporous skin which covers roughly its entire surface area. The nonporous skin, first of all, prevents possible penetration of moisture via the porous plastic foam of the sealing element body. It goes without saying that a nonporous skin, of course, seals much better than a plastic foam itself. The better seal, in turn, results in considerable improvement of the negative pressure values which are achieved in the roof space. Moreover, as was established according to the invention, the UV resistance of the sealing element is much higher when the UV radiation acts on the skin and not on the plastic foam. Furthermore, it is provided according to the invention that the skin is formed from a structural change of the surface of the sealing element body; therefore, the plastic foam, consists of the same plastic as the sealing element body, and is permanently joined to it. In contrast to a protective layer applied subsequently, which is likewise fundamentally possible, the intimate connection of the skin to the sealing element body which is present according to the invention has the advantage that undesirable or unintentional detachment of the skin cannot occur. Overall therefore, because the sealing element body and skin form one unit of the same material over the entire surface, the service life of the sealing element is greatly increased, and moreover, an improved ventilation function is guaranteed.

In the prior art, the sealing elements are cemented to the ventilator cover bodies. Attachment of the sealing element to the ventilator cover body can also be accomplished in the above-described ventilator cover according to the invention, or in the above described sealing element according to the invention. According to another teaching of the invention which can also be accomplished when the ventilator cover or the sealing element is not executed in the aforementioned manner, the sealing element can be detachably joined to the ventilator cover body. The advantage of this detachable joining capacity is based on the finding that malfunctions in ventilator covers with wedge-shaped sealing elements cannot be attributed to the ventilator cover body, but only to the sealing element. The advantage of this detachable connection of the sealing element to the ventilator cover body consists in that, when the sealing element is damaged, the entire ventilator cover need not be replaced, as in the past, but simply the sealing element; this is easily possible as a result of the detachable mounting.

According to the invention, in the process for producing the sealing element described at the beginning, it is provided that the plastic and blowing agent are placed, preferably injected, as mold material into a production mold, foaming is done with formation of plastic foam and at least one mold wall of the production mold is cooled, such that the blowing agent condenses on the cooled mold wall and an essentially closed skin which extends over the entire area of the cooled mold wall of the molded article forms on the surface of the foamed molded article which lies against the cooled mold wall. In contrast to the prior art, in the process according to the invention, therefore, cooling is done in a quite controlled manner in order that the desired skin is obtained. By controlled and uniform cooling, which is done over the entire surface, the formation of undesirable individual condensation cavities of blowing agent is prevented.

The desired thickness of the skin can be adjusted by means of appropriately selected cooling of the mold wall depending on the plastic and blowing agent used. Moreover, when the production mold has a wedge shape in cross section, a wedge-shaped sealing element can be directly produced without any need for cutting after producing the molded article. Instead of a production mold which is wedge-shaped in cross section, a production mold roughly rectangular in cross section can be used in which at least two opposite mold walls are cooled in the aforementioned manner. Skins are formed over the entire surface on the molded article on each of the cooled mold walls. In a single subsequent cutting process the rectangular molded articles produced in this process are divided via a diagonal cut into two sealing elements. Overall, the process according to the invention can greatly simplify the production of sealing elements since, in the process according to the invention, the molded articles removed from the production molds already have a high degree of dimensional accuracy, and optionally, need only be cut once. In any case, there is no waste in the process according to the invention.

It has already been described above that, for the sealing elements of the ventilator covers under discussion, UV radiation is a special problem, and that according to the invention, the UV resistance of the sealing element has been greatly increased by the fact that the sealing element body, on at least one of its free surfaces, specifically on the outside surface exposed to UV radiation, has a skin which covers this surface roughly over its entire area. UV resistance can be further increased by a UV resistant paint being contained in the skin of the sealing element body. Preferably, production is performed such that, first, the inner surfaces of the production mold are provided with a mold release wax, then a UV resistant paint is sprayed onto the inner surfaces of the production mold which are provided with mold release wax, preferably in a so-called airless process, and that, finally, the production mold is closed and the plastic and the blowing agent are introduced.

Furthermore, it is provided according to the invention that, not only the sealing element, but also a carder part connected to the sealing element or the ventilator cover body, can be produced in a single production. process. Corresponding cooling of the mold walls in the area of the carrier part or ventilator cover body to be produced causes essentially complete condensation of the blowing agent in this area. The process for producing a sealing element with a carrier part, or a ventilator cover with a ventilator cover body and a sealing element as one piece at a time, therefore, as a unit, according to the invention, leads to considerable simplification of the production process. Moreover, problems which can arise as the result of an adhesive connection between the ventilator cover body and the sealing element are prevented., in any case, since the ventilator cover body and the sealing element are intimately joined.

Other features, advantages and possible applications of the invention follow from the following description of the embodiments using the drawings, and from the drawings themselves. In doing so all the described and/or pictured features, themselves, or in any combination, form subject matter of this invention.

DETAILED DESCRIPTION OF THE PREFERRED EMBODIMENTS

Figure 1:
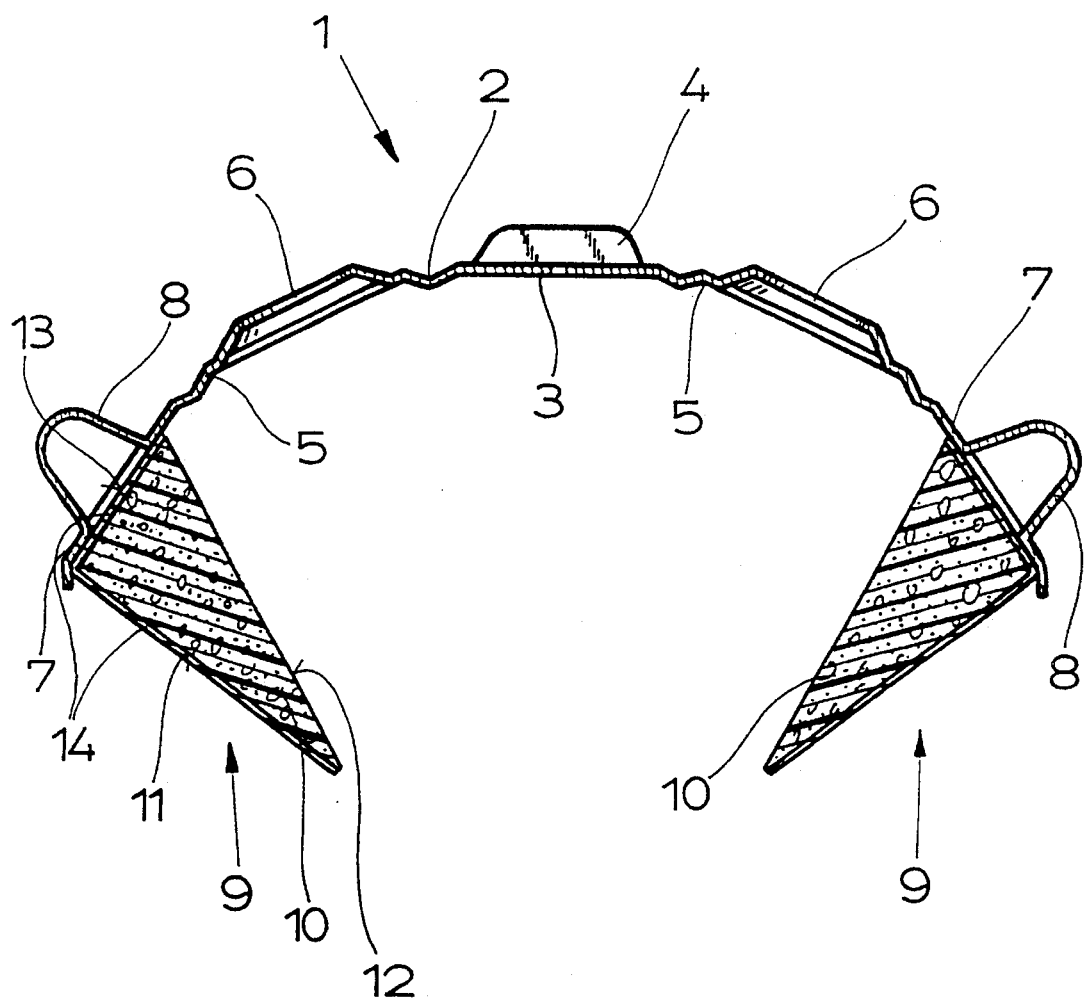
FIG. 1 shows a ventilator cover according to the invention in cross section with two sealing elements formed according to the invention.

FIG. 1 shows a ventilator cover 1 which is made of plastic and which is used for exhaust ventilation of roofs in the ridge, hip, or arris area. Ventilator cover 1 has ventilator cover body 2 which is provided with an attachment area 3 on which beating humps 4 are located. A intermediate area 5, in which there are a plurality of round or longitudinally extended, preferably chimney-like air passage openings 6 adjoins laterally opposite sides of attachment area 3. An edge area 7, having supporting humps 8 on its top, adjoins each intermediate area 5 laterally to the outside thereof.

Ventilator cover 1, at the bottom of each of its edge areas 7, has a wedge-shaped sealing element 9 which has a sealing element body 10 which is formed of plastic foam. Sealing element 9 can be permanently joined to the bottom of the respective edge area 7, such as by being cemented to edge areas 7.

Sealing element body 10, when viewed in cross section, is wedgeshaped having three surfaces 11, 12, 13, specifically, outside surface 11, inside surface 12, and mounting surface 13, which is used for attachment thereof to the ventilator cover body 2. Since sealing element 9 is joined to edge area 7 of ventilator cover body 2 in the area of surface 13, surfaces 11 and 12 are so-called free surfaces.

First of all, it is significant, at this point, that the sealing element body 10, on at least one of its free surfaces 11, 12, has an essentially nonporous, therefore, closed skin 14 which covers surfaces 11, 12 roughly over their entire area. In the embodiment shown in FIG. 1, skin 14 is provided on surfaces 11 and 13 of sealing element body 10. If there is a skin 14 also on inside surface 12, sealing element 9 with an especially outstanding sealing action and high service life is formed, since, even in the case of damage of skin 14, on the outside surface 11, as a result of strong Weathering or UV radiation action, the sealing action is ensured on inside surface 12 by the undamaged skin located on the inside.

It can be especially advantageous skin 14 on surface 13 since the nonporous skin 14, specifically, prevents cement from soaking into porous sealing element body 10 when the cement for cementing sealing element 9 to ventilator cover body 2 is applied. In this way, cement consumption when cementing sealing element 9 is minimized.

Production of the sealing element 9, according to the invention, is as follows:

Plastic and blowing agent are placed together as the so-called molding material in liquid form in a production mold. It is, preferably, a discontinuous process, so that injection molding presents itself. The production mold is closed during production. The blowing agent causes a foaming reaction and leads to formation of a plastic foam. To produce the aforementioned skin at least one mold wall of the production mold is cooled. Cooling can be done in different ways which need not be detailed here since cooled molds are well known in the molding art. As a result of cooling, the blowing agent condenses in the area of the cooled mold wall, by which an essentially nonporous skin forms on the surface of the foamed molded article adjacent to this mold wall, this skin extending over the entire cooled surface of the molded article. Shrinkage on the cooled outer wall, which occurs as a result of condensation of the blowing agent, is balanced by the volume increase in the interior of the foamed molded article which results from the foaming, so that after the end of the foaming reaction, a molded article which completely fills the production mold is formed with high dimensional accuracy.

Fundamentally, definite requirements with respect to integrity and flexibility are imposed on a sealing element of this type. To achieve a dense skin 14 which, however, does not adversely affect the flexibility of sealing element 9, selective control of the thickness of skin 14 is necessary. This can take place via selective, but essentially uniform, adjustment of the temperature of the outside wall. Preferably, the thickness of skin 14 which is roughly the same everywhere is 1 micron to 500 microns, especially 10 microns. Reaching these values, of course, depends not only on the temperature of the mold wall, but also on the type of plastic or blowing agent used; but given the thickness desired, those skilled in the foam molding art will be able to arrive at the proper temperature conditions and the type and quantity of blowing (foaming) agent.

Sealing element 9 shown in FIG. 1 can be easily produced using the described process. By means of corresponding control and adjustment of temperature of the individual mold walls, it is easily possible to form the skin 14 on each surface of the molded article, or also only on quite specific surfaces.

Production of a sealing element 9 in which cutting of the molded article is not necessary at all, in which therefore the completely foamed molded article corresponds uniformly to the sealing element, is possible when the production mold corresponds in cross section to the wedge shape of sealing element 9. Skin 14 can be provided by corresponding cooling of any or all of the three surfaces 11, 12, 13, according to the respective requirements.

Figure 2:
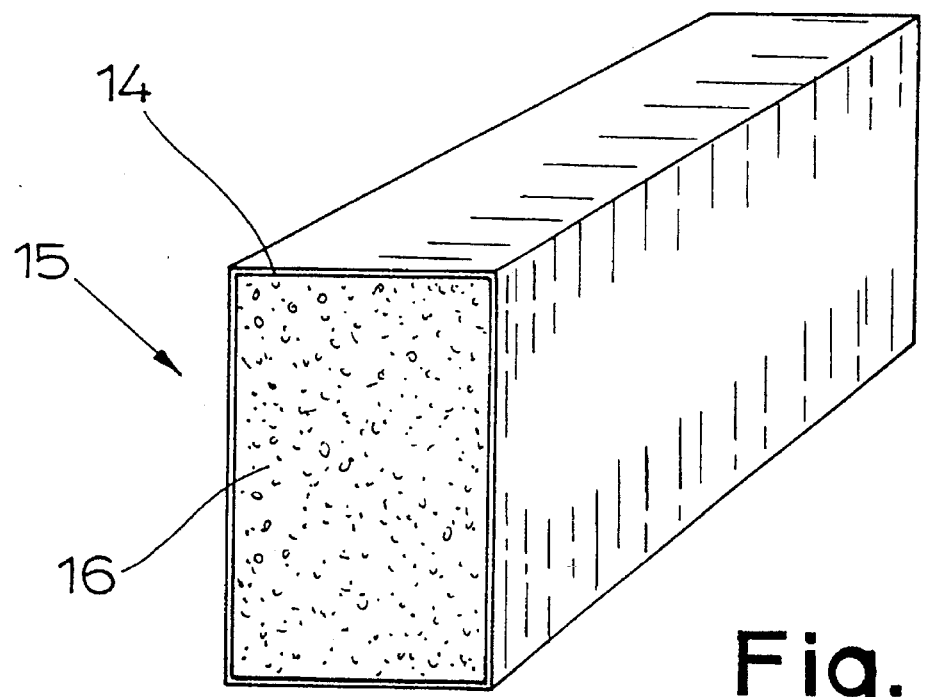
FIG. 2 shows a perspective view of a molded article produced using the process according to the invention.
Figure 3:
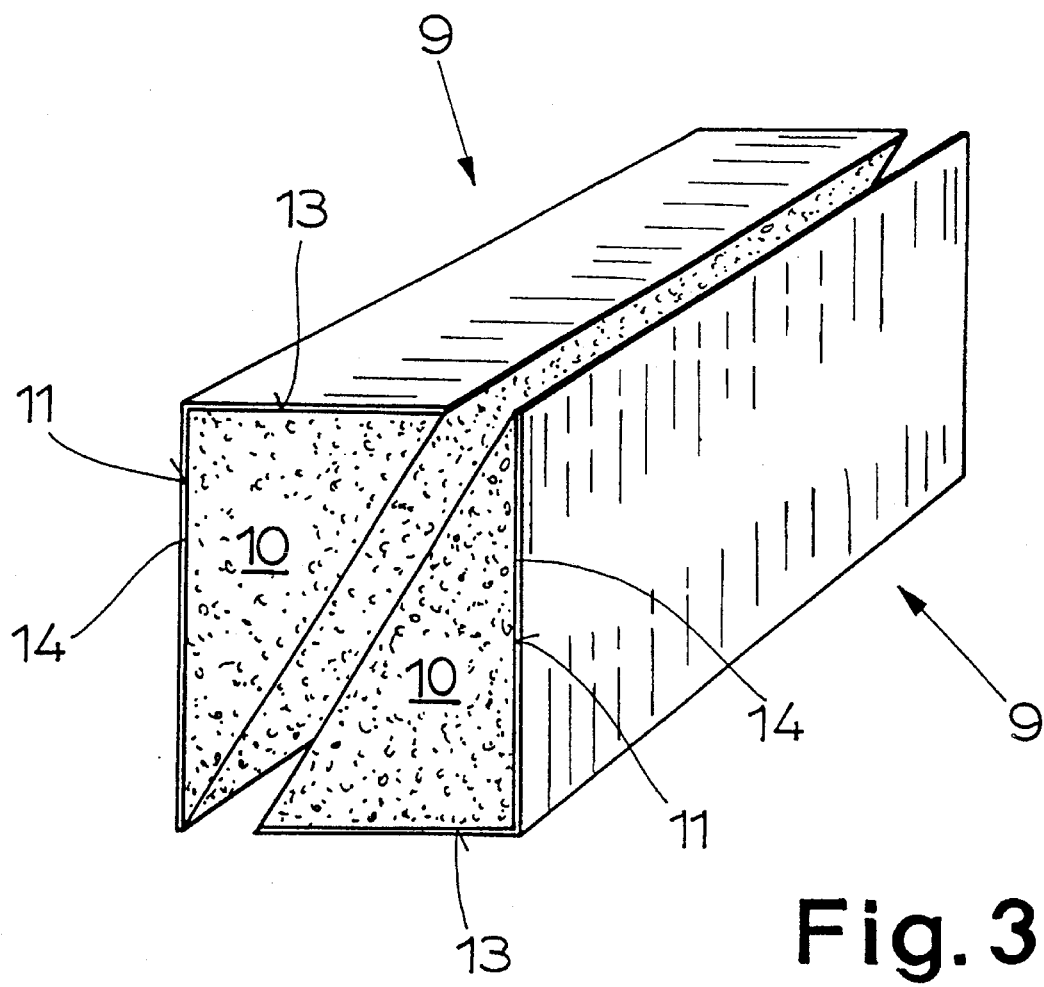
FIG. 3 shows a perspective view of two sealing elements produced from the molded article according to FIG. 2.

Instead of a production mold which is wedge-shaped in cross section, a production mold that is roughly rectangular in cross section can also be used. In it, a rectangular molded article 15 is produced accordingly, as is shown in FIG. 2. The molded article 15 has a porous core 16 of plastic foam. Core 16, in turn, is provided with skin 14 on its entire outer surface. The molded article 15 can have a length of, for example, 1 m with a width of, for example, 30 mm, which corresponds to ventilator cover body 2. The height of molded article 15, depending on the desired shape of sealing element 9, can vary. Completely foamed rectangular molded article 15 is divided, preferably cut, along a diagonal after its production. In this way, one molded article 15 yields two sealing elements 9 which bear skin 14 on both the outside surface 11 and the mounting surface 13 of sealing element body 10; this is shown in FIG. 3. Of course, by the corresponding control of the production process, it is also possible to form molded article 15 such that there is skin 14 only on outside surface 11.

Especially polystyrene, styrene copolymers, hard and soft PVC, polycarbonates, polyolefins, polyurethanes, polyisocyanurates, polycarbodiimides, polymethacrylimides, polyamides, ABS, phenolic and urea resins, polyethylene, polypropylene and polycarbonates are suitable as the plastic for producing sealing element 9 according to the invention.

Not shown are special measures which further increase the UV resistance of sealing element 9 under discussion. These measures of special importance consist in that, first, the inner surfaces of the production mold are provided with a mold release wax, that afterwards UV resistant paint is sprayed onto the inner surfaces of the production mold which are provided with the mold release wax, preferably in a so-called airless process, and that, finally, the production mold is closed and the plastic and blowing agent are introduced.

Figure 4:
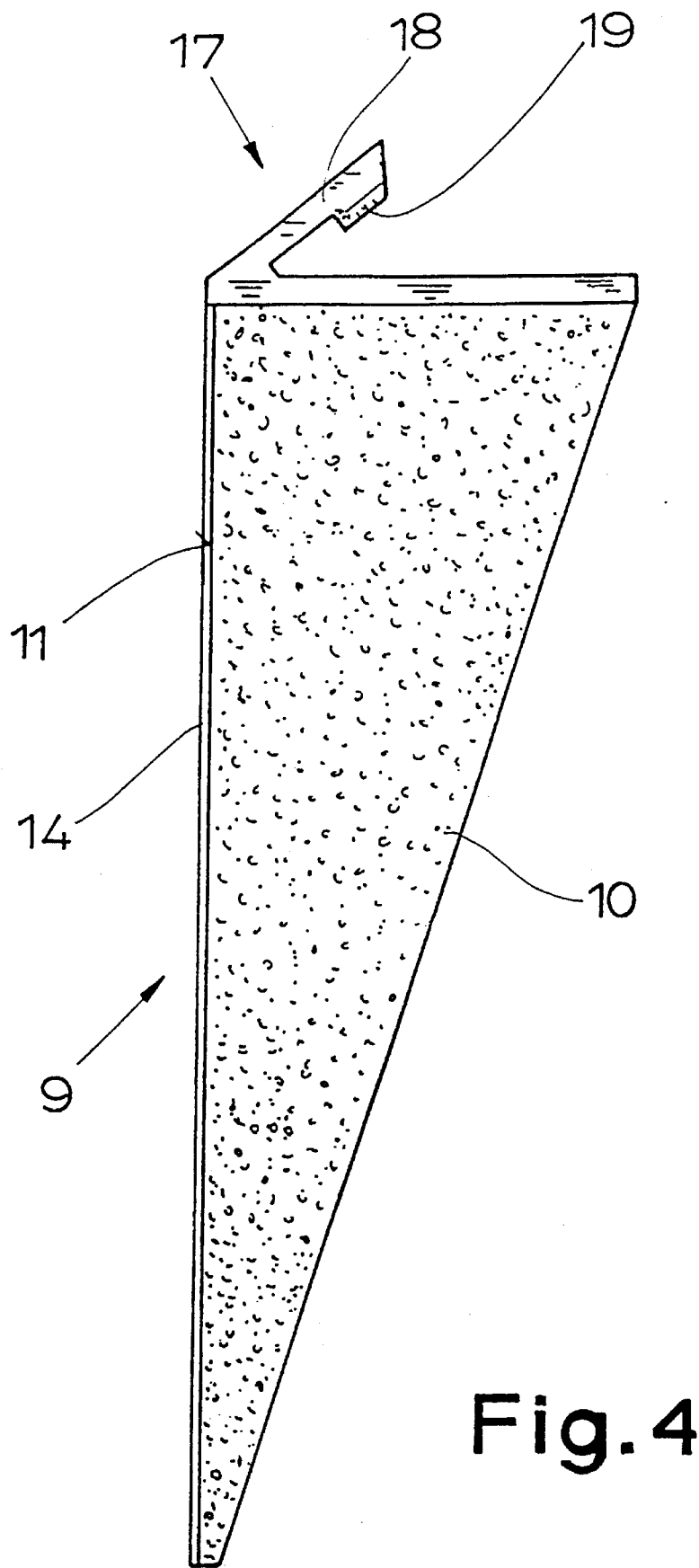
FIG. 4 shows another embodiment of a sealing element according to the invention in cross section.
Figure 5:
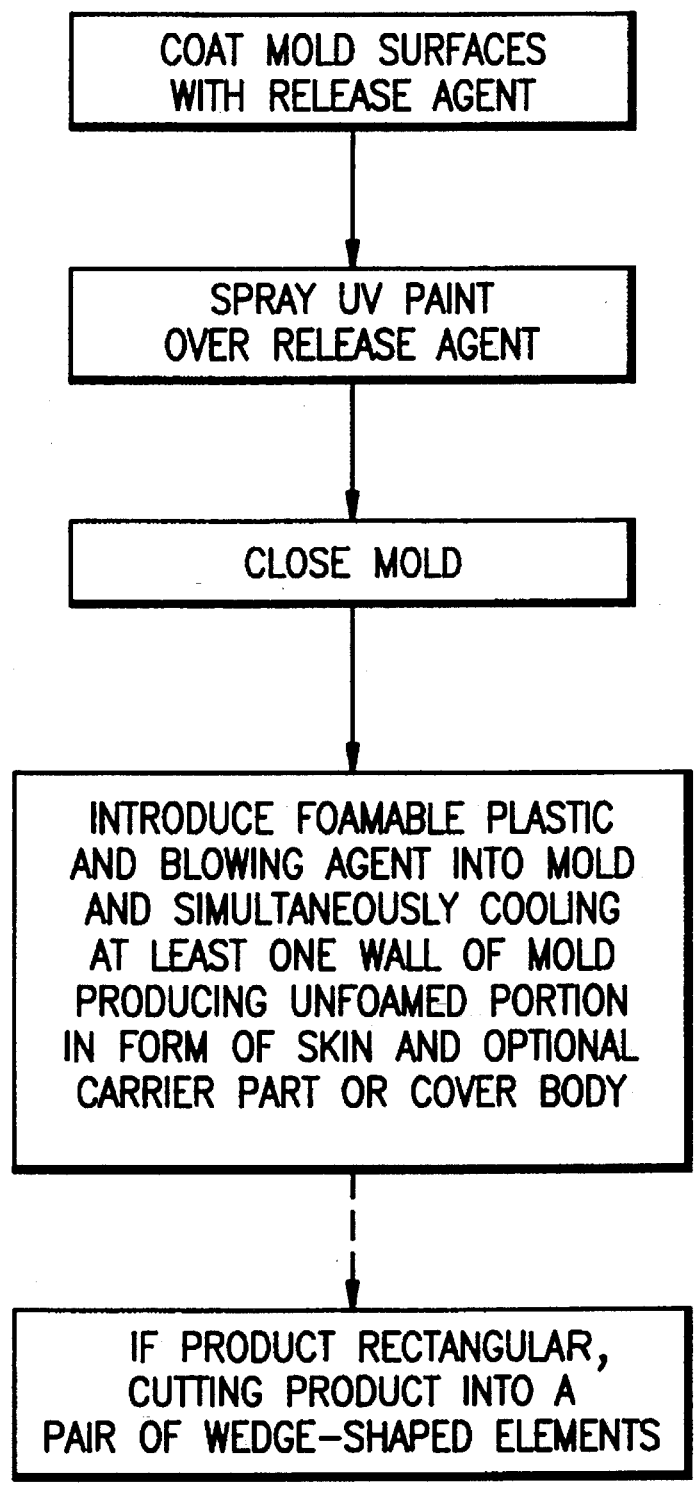
FIG. 5 is a flow chart illustrating process aspects of the present invention.

FIG. 4 shows an embodiment of sealing element 9 which bears skin 14 only on its outside surface 11. Furthermore, sealing element 9 is provided with carrier part 17 which is used for locking onto a locking strip or inserting into an insert strip in edge area 7 of the ventilator cover body 2 shown in FIG. 1. For this purpose, the carrier part 17 has a bent arm 18 with a projection 19 which is used for locking or inserting.

Sealing element 9 shown in FIG. 4 can be produced in one process step together, therefore integrally, with carrier part 17. This is done by corresponding cooling of the mold walls of the production mold in the area where the carrier part 17 is to be produced. Cooling can be produced in such a way that the blowing agent in the area of carrier part 17, especially in the area of bent arm 18, condenses fully, so that in this area "solid" (i.e., compacted as opposed to foamed) plastic is present. In this way, the carrier part 17 achieves sufficient strength without the elastic and sealing properties of sealing element 10 suffering.

In a development of the above-described inventive idea, not only can a carrier part together with a sealing element be produced, but also a ventilator cover body. By the corresponding formation and cooling of the mold walls in the area of the ventilator cover body, the blowing agent condenses completely in this area, so that the ventilator cover body consists of solid plastic; however, as before, the sealing element body is comprised of plastic foam. The sealing element is therefore joined intimately to the ventilator cover body, with or without skin 14. A ventilator cover of this type, in which the ventilator cover body and sealing element consist of one piece, or as the result of their production form one unit, avoids all the problems which can arise when the sealing element is cemented to the ventilator cover body.

In the production of a complete ventilator cover with ventilator cover bodies and sealing elements, special care must be taken in the corresponding choice of the plastic. It must, on the one hand, have a high strength for the ventilator cover body. On the other hand, the plastic foam of the sealing element body must have high flexibility into order to be able to achieve the require sealing properties.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. A ventilator cover for exhaust ventilation of roofs in the ridge, hip and arris areas, having a ventilator cover body and at least one sealing element, said sealing element having an approximately wedge-shaped cross section and a sealing element body formed of a plastic foam material; wherein the sealing element body has an essentially nonporous skin on at least an outer side surface thereof, said skin covering substantially the entirety of said outer side surface; and wherein said skin is formed of the same plastic as the sealing element body being an unfoamed portion of the material of the sealing element body which is permanently connected to sealing element body as a unitary part thereof on at least said outer side surface.

2. A ventilator cover according to claim 1, wherein the at least one sealing element body has a mounting surface for attachment thereof to said ventilator cover body, said skin also covering substantially the entirety thereof.

3. A ventilator cover according to claim 1, wherein a UV resistant paint is contained in said skin.

4. A process for producing a ventilator cover for exhaust ventilation of roofs in the ridge, hip and arris areas, having a ventilator cover body and at least one sealing element, said sealing element having an approximately wedge-shaped cross section and a sealing element body formed of a plastic foam material; wherein the sealing element body has an essentially nonporous skin on at least an outer side surface thereof, said skin covering substantially the entirety of said outer side surface; and wherein said skin is formed of the same plastic as the sealing element body being an unfoamed portion of the material of the sealing element body which is permanently connected to sealing element body as a unitary part thereof on at least said outer side surface; comprising the steps of introducing a foamable plastic material and a blowing agent into a production mold; foaming said plastic material while cooling at least one mold wall of the production mold to a temperature cool enough to condense the blowing agent in an area of the cooled mold wall, producing an essentially closed skin which extends over substantially the entirety of a corresponding surface of a resulting foamed molded article which lies against the cooled mold wall.

5. A process according to claim 4, wherein the temperature to which the mold wall is cooled is coordinated to the plastic material and blowing agent used so as to produce a thickness of the skin of from 1 to 500 microns.

6. A process according to claim 4, wherein the temperature to which the mold wall is cooled is coordinated to the plastic material and blowing agent used so as to produce a thickness of the skin of 10 microns.

7. Process according to claim 6, wherein the molded article produced which is roughly rectangular in cross section and is cut diagonally to yield a pair of wedge-shaped sealing elements.

8. Process according to claim 5, wherein the foamable plastic material is a material selected from the group consisting of polystyrene, styrene copolymers, hard and soft PVC, polycarbonates, polyolefins, polyurethanes, polyisocyanurates, polycarbodiimides, polymethacrylimides, polyamides, ABS, phenolic and urea resins, polyethylene, polypropylene and polycarbonates and the blowing agent is a material selected from the group consisting of so or diazo compounds.

9. Process according to claim 4, comprising, preliminary to said introducing step, first, providing inner surfaces of the production mold with a mold release wax, then spraying a UV resistant paint onto the inner surfaces of the production mold which are provided with the mold release wax, and closing the production mold.

10. Process according to claim 4, wherein a carrier part joined to the sealing element is formed in the production mold simultaneously with the sealing element; and wherein mold walls in an area of the mold at which the carrier part is formed are cooled to a temperature which essentially completely condenses the blowing agent in said area of the mold.

11. Process according to claim 4, wherein the ventilator cover body is formed in the production mold simultaneously with the sealing element; and wherein mold walls in an area of the mold at which the ventilator cover body is formed are cooled to a temperature which essentially completely condenses the blowing agent in said area of the mold, while enabling foaming of the plastic material introduced in an area of the mold at which the sealing element body of the sealing element is formed.

* * * * *